Dec. 5, 1961  J. POMAGALSKI  3,011,624
ENDLESS-CONVEYOR-CABLE DRIVE STATIONS
Filed Dec. 22, 1958  2 Sheets-Sheet 1
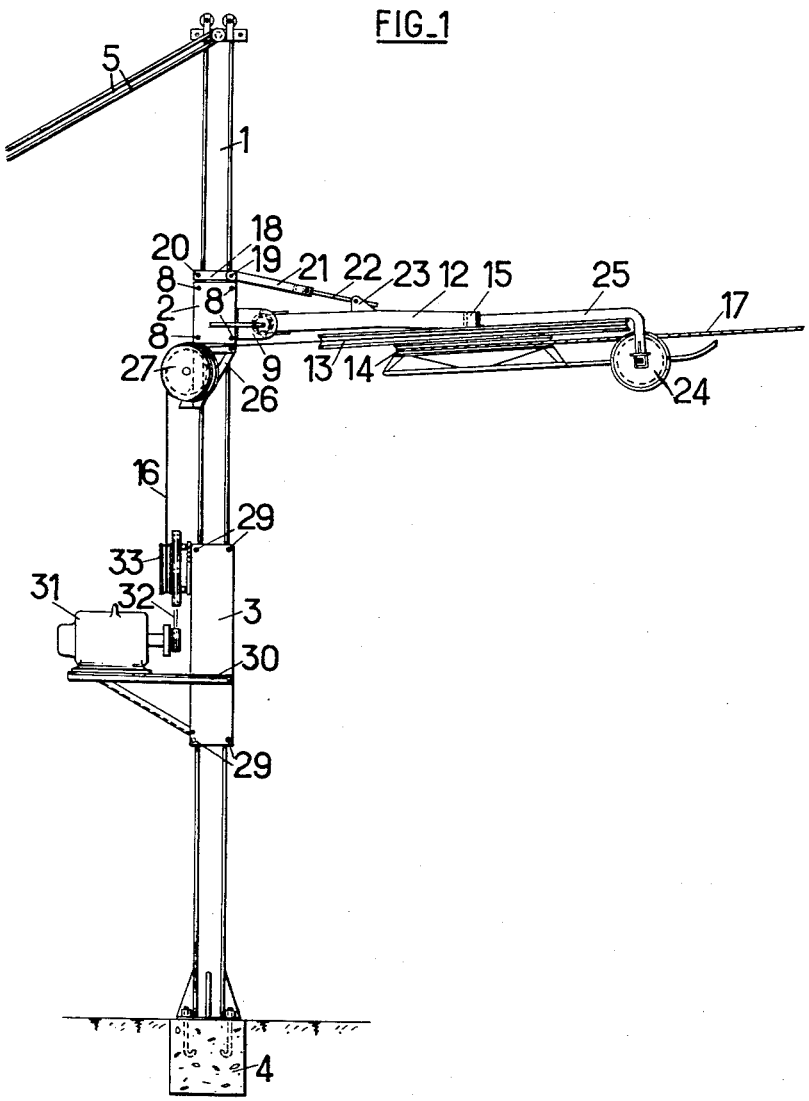
FIG_1
Inventor
J. Pomagalski
Attys.

Dec. 5, 1961  J. POMAGALSKI  3,011,624
ENDLESS-CONVEYOR-CABLE DRIVE STATIONS
Filed Dec. 22, 1958  2 Sheets-Sheet 2
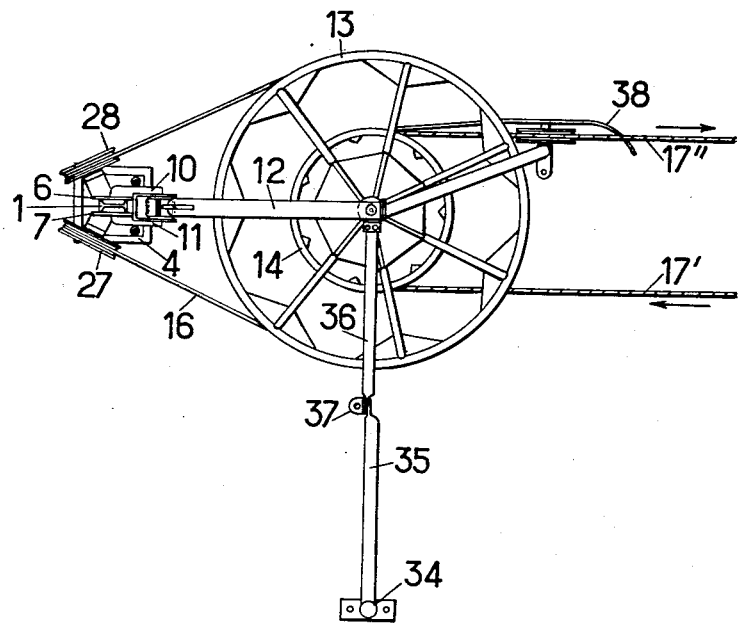

United States Patent Office 3,011,624
Patented Dec. 5, 1961

3,011,624
ENDLESS-CONVEYOR-CABLE DRIVE STATIONS
Jean Pomagalski, 80 Rue Charles Michels,
Fontaine, France
Filed Dec. 22, 1958, Ser. No. 782,115
6 Claims. (Cl. 198—203)

The present invention relates to drive stations for conveyor systems of the endless cable type, such as ski-trains, telfer seats or material conveyors, and is more particularly concerned with systems which utilize an endless cable of relatively short length.

Installations of the latter type usually have to be designed with fairly simple and economical means; in particular, the pylons supporting the pulleys are stressed to a lesser degree and are relatively light and of small height.

On the other hand such stations are particularly sensitive to snowfall depths, since this can cause the clearance beneath the cable to vary considerably from day to day.

The present invention has for its object a type of installation wherein the pulley heights can be easily and rapidly modified, and has still more particularly for its object an easy and rapid displacement in height of the drive pulley.

Other ancillary objects of the invention will become apparent from the following description of an example of an embodiment of the invention, it being clearly understood that in no way do I intend the scope of the latter to be limited to or by the specific details of the example chosen for illustration purposes.

In the accompanying drawings:
FIG. 1 is a view in elevation of the drive station.
FIG. 2 is a plan view thereof.

In these drawings, numeral 1 designates a vertical iron member which serves both as a support and a guide for two runners 2 and 3 designed to slide along this member. In this particular example, iron member 1 is of I-section and is anchored in any appropriate manner to a foundation 4. In addition, provision is made for guys 5 fixed to the head of iron member 1 and of which only the extremity is illustrated.

The upper runner 2 is very simply constituted with two plates 6 and 7 held against iron member 1 by bolts such as 8, these two plates being slidable along the length of the shoes of I-member 1 when the bolts are slackened.

To these two plates is welded a yoke 9, between the cheeks 10 and 11 of which is allowed to pivot an arm 12, of tubular form in the example, which is rotatable about a pin carried by the two cheeks 10 and 11.

The arm 12 carries a pulley having two grooves 13 and 14 or else two integral pulleys rotating about a common axle 15.

In groove 13 is accommodated the drive cable 16, while groove 14 accommodates the endless traction cable 17, of which 17' is the descending run and 17" the ascending run, the direction of motion being indicated by arrows.

Arm 12 is guyed by means of an adjustable device. This device comprises an auxiliary runner 18 which may or may not be part of runner 2; like runner 2, runner 18 consists of two plates which can be locked against iron member 1 by means of bolts 19 and 20. Bolt 20 serves at the same time as a pivoting pin for an internally threaded tube 21 into which penetrates a threaded bolt 22 the other extremity of which is rotatably and pivotably secured between two vertical flanges such as 23 welded to the arm 12. This device, which is well-known per se, is not shown in FIG. 2 for clarity purposes. Obviously, it can be replaced by any other similar device.

It would be advantageous to provide a roller 24 to ensure that run 17" exists well in alignment with the plane of groove 14. This roller is carried by an arm 25, itself supported by arm 12, and therefore forms one with the assembly carried by runner 2.

Runner 2 further carriers a chassis 26, with which it is integral, and which supports two guide pulleys 27 and 28 located in vertical planes tangential to groove 13 and designed respectively to accommodate, without deflection, the two runs of endless drive cable 16.

In contradistinction to runner 2, runner 3 must always be able to slide along member 1. The two plates forming runner 3 are accordingly cross-braced at a fixed distance from each other, say by means of bracing studs 29, the gap between the plates being such that they shall not foul iron member 1. Runner 3 carries a platform 30 upon which is rigidly mounted a motor 31, for example of the electric type.

A belt 32 serves to take the drive, via suitable reduction, from the pulley of this motor to a pulley 33 rotatably mounted on to runner 3. The endless cable 16 is made to pass over this pulley, so that runner 3 is supported solely by cable 16, while, conversely, the tensioning force in cable 16 is derived from the weight of the runner 3, the platform and the motor, with the addition, should this weight prove inadequate, of a counterweight (not shown).

This being so, it will be seen, firstly, that runner 3 must follow the movements of runner 2 and that the complete assembly is consequently adjustable for height by loosening and then tightening bolts 8 and, secondly, that the plane in which groove 14 lies is orientable into that of the two runs of cable 17 by means of the guying-adjustment device described hereinbefore, while cable 16 adjusts itself automatically.

Referring now to FIG. 2, numeral 34 designates a bracing pylon, of adjustable height, carrying an arm 35, 36 which is articulated at 37 by means of a locking joint and which is designed to withstand the sideways force set up by cable 17. For this purpose, the extremity of the arm 37 is articulated with respect to both axle 15 and arm 12.

Numeral 38 designates the usual guide rail for cooperation with the slings or tow-lines (not shown).

I claim:
1. In a drive station for conveyor systems of the endless cable type, in combination a first endless conveying cable, a first pulley having a groove to accommodate said cable, a second pulley in driving relationship with said first pulley, a first runner carrying said first and second pulley in operative position with respect to said endless cable, a standard on which said first runner is mounted for vertical adjustment thereon, releasable means to secure said first runner to said standard in adjusted position, a second runner, a third pulley carried by said second runner, said second runner being slidably mounted on said standard, a motor carried by said second runner in driving relationship with said third pulley, and a second endless cable driven by said third pulley, and supporting said second platform driving said second pulley.

2. In a drive station for conveyor systems of the endless cable type, in combination a first endless conveying cable, a second endless driving cable, a first pulley having two grooves, one groove accommodating said first cable, said second groove accommodating said second cable, a first runner carrying said first pulley, guide pulleys on said first runner over which said second cable is guided to said second groove, a generally vertical standard on which said first runner is adjustably mounted, releasable means to secure said first runner to said standard in adjusted position, a second runner slidably mounted on said standard below said first runner, a second pulley carried by said second runner and having a groove therein, and a motor carried by said second runner in driving relationship with said second pulley, said groove of said second pulley accommodating said second cable, whereby said second cable is driven by said second pulley, drives said first pulley and supports said second runner.

3. The drive station of claim 1, in which said first runner includes an arm pivotally mounted at its end near said standard and on which said first pulley is mounted whereby the angle of the plane of said first pulley with respect to said standard may be adjusted.

4. The drive station of claim 2, in which said first runner includes an arm pivotally mounted at its end near said standard and on which said first pulley is mounted whereby the angle of the plane of said first pulley with respect to said standard may be adjusted.

5. The drive station of claim 3, further including an auxiliary runner adjustably mounted on said standard above said first runner, means to secure said auxiliary runner to said standard, and adjustable guy means between said auxiliary runner and said arm.

6. The drive station of claim 4, in which said first runner includes an arm pivotally mounted at its end near said standard, said first pulley being mounted on said arm whereby the angle of the plane of said first pulley with respect to said standard may be adjusted, an auxiliary runner adjustably mounted on said standard above said first runner, means to secure said auxiliary runner to said standard, and adjustable guy means between said auxiliary runner and said arm.

References Cited in the file of this patent

UNITED STATES PATENTS

| | | |
|---|---|---|
| 824,164 | Willson | June 26, 1906 |
| 2,394,638 | Schrader | Feb. 12, 1946 |
| 2,677,331 | Hauseman | May 4, 1954 |

FOREIGN PATENTS

| | | |
|---|---|---|
| 169,634 | Austria | Dec. 10, 1951 |